United States Patent
Fascenda et al.

(10) Patent No.: US 10,110,373 B2
(45) Date of Patent: Oct. 23, 2018

(54) SYSTEM AND METHOD FOR MANIPULATING BOTH THE PLAINTEXT AND CIPHERTEXT OF AN ENCRYPTION PROCESS PRIOR TO DISSEMINATION TO AN INTENDED RECIPIENT

(71) Applicant: Protected Mobility, LLC, Rockville, MD (US)

(72) Inventors: Anthony C. Fascenda, Leland, NC (US); Emil Sturniolo, Medina, OH (US)

(73) Assignee: Global Integrity, Inc., McLean, VA (US)

( * ) Notice: Subject to any disclaimer, the term of this patent is extended or adjusted under 35 U.S.C. 154(b) by 42 days.

(21) Appl. No.: 15/044,848

(22) Filed: Feb. 16, 2016

(65) Prior Publication Data
US 2016/0241387 A1    Aug. 18, 2016

Related U.S. Application Data

(60) Provisional application No. 62/116,179, filed on Feb. 13, 2015.

(51) Int. Cl.
*H04L 9/06* (2006.01)
*H04L 9/00* (2006.01)

(52) U.S. Cl.
CPC ............ *H04L 9/0631* (2013.01); *H04L 9/002* (2013.01)

(58) Field of Classification Search
CPC ... H04L 9/0631; H04L 9/002; H04L 2209/24; H04L 9/0618; H04L 2209/34; H04L 9/14; H04L 9/008
See application file for complete search history.

(56) References Cited

U.S. PATENT DOCUMENTS

| | | | | |
|---|---|---|---|---|
| 7,054,443 | B1* | 5/2006 | Jakubowski | G11B 20/00086 380/201 |
| 9,331,848 | B1* | 5/2016 | Pedersen | H04L 9/003 |
| 9,998,279 | B2* | 6/2018 | Michiels | H04L 9/0618 |
| 2003/0016820 | A1* | 1/2003 | Volpert, Jr. | H04L 9/065 380/37 |
| 2005/0071652 | A1* | 3/2005 | de Jong | G06F 21/10 713/189 |
| 2005/0071653 | A1* | 3/2005 | de Jong | G06F 21/125 713/189 |
| 2005/0071655 | A1* | 3/2005 | de Jong | G06F 21/125 713/190 |
| 2007/0071236 | A1* | 3/2007 | Kohnen | H04L 9/0631 380/29 |

(Continued)

OTHER PUBLICATIONS

Chow et al., "White-Box Cryptography and an AES Implementation", 2002, pp. 1-18. (Year: 2002).*

*Primary Examiner* — Yonas A Bayou
(74) *Attorney, Agent, or Firm* — Nixon & Vanderhye P.C.

(57) ABSTRACT

This technology manipulates both the plaintext and ciphertext before and after encryption respectively and prior to dissemination to recipients. The manipulation mitigates the possibility of discovery of the encryption key(s) and/or encryption parameters. Even if all of the encryption parameters are known and the encryption key is made available, considerable information would still need to be obtained to enable the recipient to be able to properly decrypt an encrypted message.

28 Claims, 8 Drawing Sheets

(56) References Cited

U.S. PATENT DOCUMENTS

| | | | |
|---|---|---|---|
| 2011/0116624 A1* | 5/2011 | Farrugia | G06F 8/51 380/28 |
| 2012/0210303 A1* | 8/2012 | Ciet | G06F 7/00 717/120 |
| 2013/0061061 A1* | 3/2013 | Farrugia | G09C 1/00 713/190 |
| 2017/0126398 A1* | 5/2017 | Wiener | H04L 9/0631 |

* cited by examiner

FIG. 1
Encryption/Decryption Schema

FIG. 1(A)
Communications Environment Schematic

*"The quick brown fox jumped over the lazy hen and in that regard the output of eggs was substantially reduced"*

FIG. 3
Frequency Analysis Character Distribution

FIG. 2
Basic Elements

FIG. 4
Plaintext Injection

FIG. 5
Frequency Analysis after Injection

FIG. 6
Scramble Table

FIG. 7
Ciphertext Injection

FIG. 8
Multiple Tables

SYSTEM AND METHOD FOR MANIPULATING BOTH THE PLAINTEXT AND CIPHERTEXT OF AN ENCRYPTION PROCESS PRIOR TO DISSEMINATION TO AN INTENDED RECIPIENT

CROSS-REFERENCE TO RELATED APPLICATIONS

This application claims the benefit of U.S. Provisional Patent Application No. 62/116,179 filed Feb. 13, 2015, incorporated herein by reference.

STATEMENT REGARDING FEDERALLY SPONSORED RESEARCH OR DEVELOPMENT

None.

FIELD

This technology relates to cryptography and the art of encrypting a message or document.

BACKGROUND

Typical encryption utilizes a strong encryption technology such as 256-bit AES (Advanced Encryption Standard). The AES algorithm encrypts plaintext data using a symmetric encryption key and associated parameters such as an IV, Salt, Hash and iteration count. It is assumed that the receiving side possesses the same encryption parameters and key to properly decrypt the message. An adversary without such information can mount a brute-force attack trying various encryption keys and parameters to break the encrypted message although this requires enormous resources and considerable time. A more advanced method of attack utilizes techniques such as frequency analysis.

BRIEF DESCRIPTION OF THE DRAWINGS

The following detailed description of exemplary non-limiting illustrative embodiments is to be read in conjunction with the drawings of which.

DETAILED DESCRIPTION OF EXAMPLE NON-LIMITING EMBODIMENTS

The example non-limiting technology herein provides an algorithmic approach to manipulating the message or file to be transmitted prior to and after its encryption. Typical encryption systems rely on the encryption engine to do all the work and therefore the plaintext and the ciphertext are not modified. This example non-limiting algorithm-based approach does not affect the encryption technology (preferred embodiment: 256-bit Advanced Encryption Standard (AES)) nor does it improve its entropy. What it does provide is enhanced security from cryptanalysis techniques and resistant to decryption technology without access to the algorithm.

Further non-limiting features and advantages include:
- A method of manipulating both the plaintext and ciphertext of an encryption process prior to dissemination to an intended recipient wherein the goal is to mitigate the possibility of a wide range of cryptanalysis.
- A method of enhanced security using an algorithm approach to manipulating both plaintext and ciphertext.
- The utilization of ciphertext injection to randomly insert false ciphertext characters into the ciphertext output of the encryption process rendering decryption virtually impossible without knowledge of the algorithm
- The use of a scrambling technique along with character substitution with the plaintext message prior to encryption so as to mitigate the use of frequency analysis.

Figure 1:
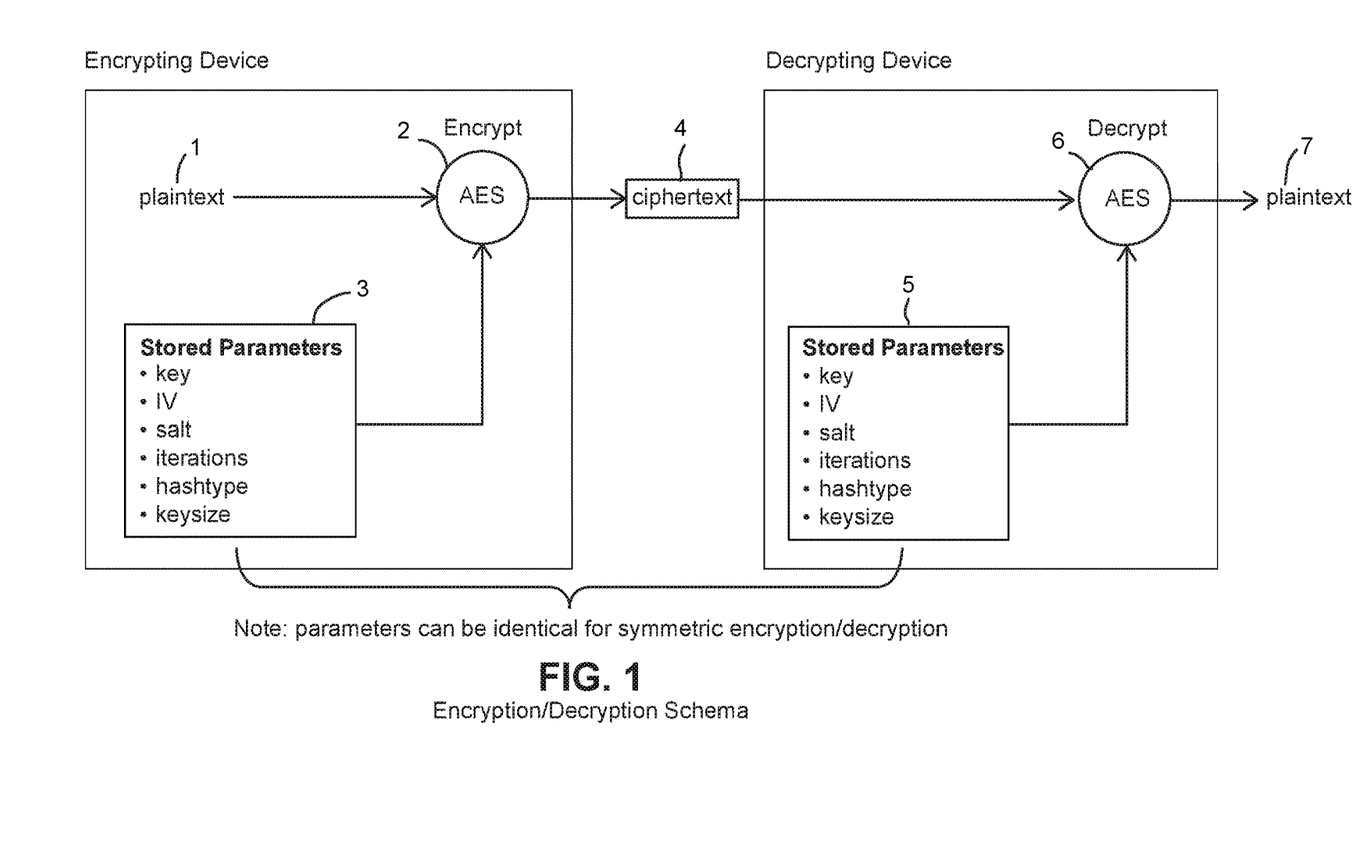
FIG. 1 illustrates the basic schema of an encryption/decryption process wherein plaintext data is encrypted using stored parameters generating ciphertext and is decrypted using identical stored parameters thus recovering the original plaintext.

Typical encryption/decryption systems as seen in FIG. 1 consist of an encryption engine (2) that encrypts plaintext data (1) using stored encryption parameters (3) resulting in ciphertext 4. On the receiving side, the ciphertext (4) is processed by a decryption engine (6) using identical stored encryption parameters (5) resulting in recovery of the original plaintext (7). While this is a simplified description of the overall process, it serves to identify the basic elements of typical modern encryption systems.

Figure 1A:
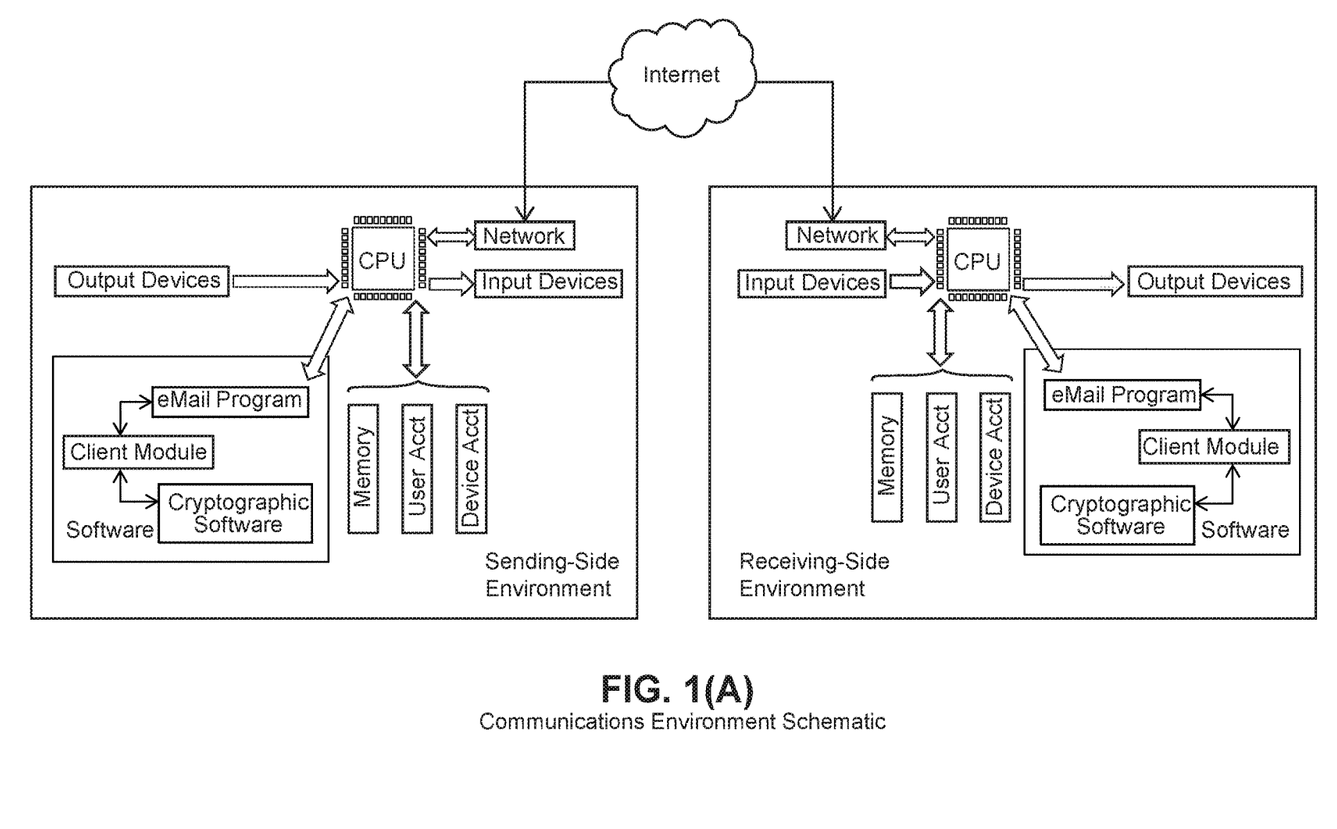
FIG. 1(A) is a communications environment schematic.

As seen in FIG. 1A, in one non-limiting embodiment, client-side software provides the mechanism for calculating encryption parameters for specific applications such as e-mail, word-processing, spreadsheets and presentations to encrypt their message/file traffic for secure distribution to intended recipients. In the FIG. 1A example, a sending-side environment communicates over a communications network with a receiving-side environment. The sending-side environment and receiving-side environments each may comprise computing environments based on any kinds of computing devices such as personal computers, embedded processing systems, smart phones, tablets, wearable computers, handheld computers, or any other computing platforms. The communications network can similarly comprise any type of communications arrangement including cellular telephone network(s), local area network(s), the Internet, short range communications such as Bluetooth or NFC, or any other type of wired or wireless communications.

In the FIG. 1A example shown, each environment comprises a CPU, a network adapter; input devices such as touch screen, keyboards, microphones or the like; output devices such as displays, speakers or the like; memory (flash, disk, RAM, ROM, etc.); account data storage and a software and/or hardware based encryption element. In some examples, the encryptor and decryptor can comprise processors executing encryption (decryption) cryptographic software (stored in non-transitory memory) that cooperates with a client module and an application such as for example an email program. In other implementations, the cryptographic functionality can be provided by hardware, programmed logic circuitry, or by any combination of hardware and software. Each such environment may store information relating to a user account and information relating to a device account.

The client-side software, typically in the form of a module, automatically encrypts/decrypts messages and files without user intervention.

Figure 2:
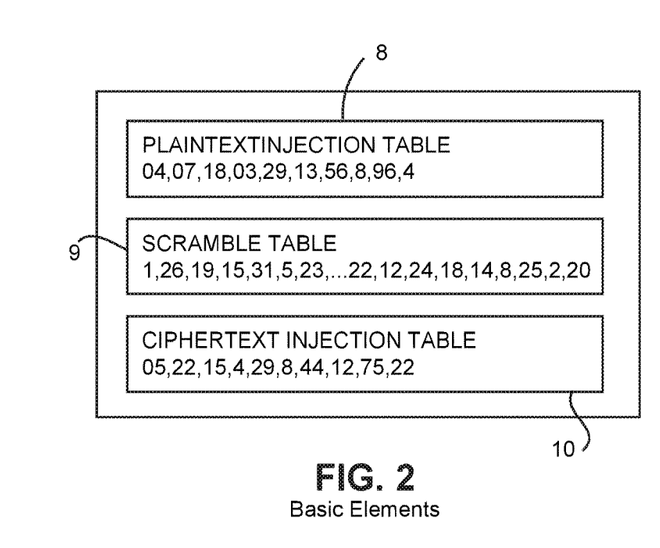
FIG. 2 illustrates the basic elements of the invention showing the minimal three tables for Plaintext Injection, Scramble Table and Ciphertext Injection table.

The basic elements of this example non-limiting technology as shown in FIG. 2 include three tables used for modifying the plaintext before encryption and the ciphertext post encryption. The resulting modified ciphertext has a much higher resistance to cryptanalysis techniques. The tables used in this example non-limiting technology are the Plaintext Injection Table (8), Scramble Table (9) and Ciphertext Injection Table (10). Each table will be described independently and then summarized.

Plaintext Injection

In most encryption systems as seen previously in FIG. 1, the plaintext (1) is simply encrypted (2) via a good encryption technology such as 256-bit AES using relevant encryption parameters (3) such as the initialization vector (IV), salt, hash type, iteration count. The resulting ciphertext (4) is sent to the receiving side of a message transmission. These parameters must be identical on both the receiving and sending side of an encrypted message transmission.

Encrypting plaintext, however, presents a problem in that natural language has a distinct pattern of character distribution that can be exploited.

In cryptanalysis, frequency analysis is the study of the frequency of letters or groups of letters in a ciphertext. The method is used as an aid to breaking classical ciphers.

Frequency analysis is based on the fact that, in any given stretch of written language, certain letters and combinations of letters occur with varying frequencies. Moreover, there is a characteristic distribution of letters that is roughly the same for almost all samples of that language. For instance, given a section of English language, E, T, A and O are the most common, while Z, Q and X are rare. Likewise, TH, ER, ON, and AN are the most common pairs of letters (termed bigrams or digraphs), and SS, EE, TT, and FF are the most common repeats.

Figure 3:
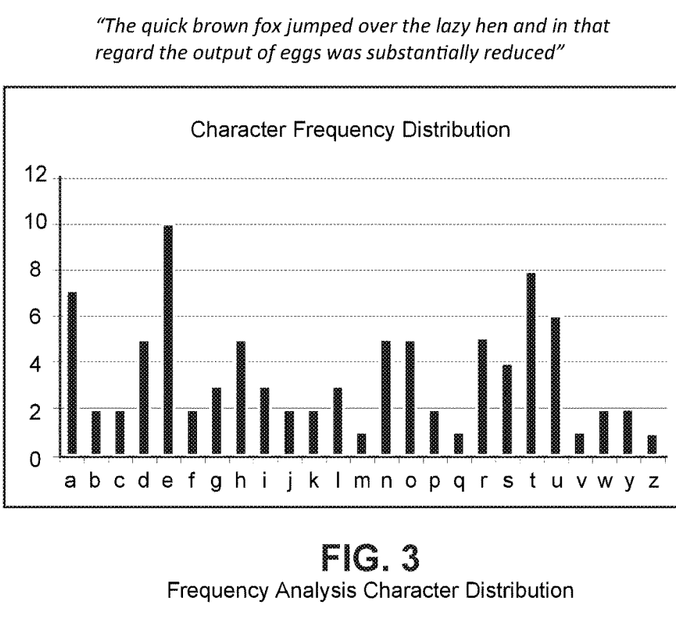
FIG. 3 illustrates the character frequency distribution of a typical sentence.

As seen in FIG. 3, the following phrase has the character distribution shown. As one can readily see, the vowels "a", "e", "i", "o" and "u" have a higher frequency than other characters.

Figure 4:
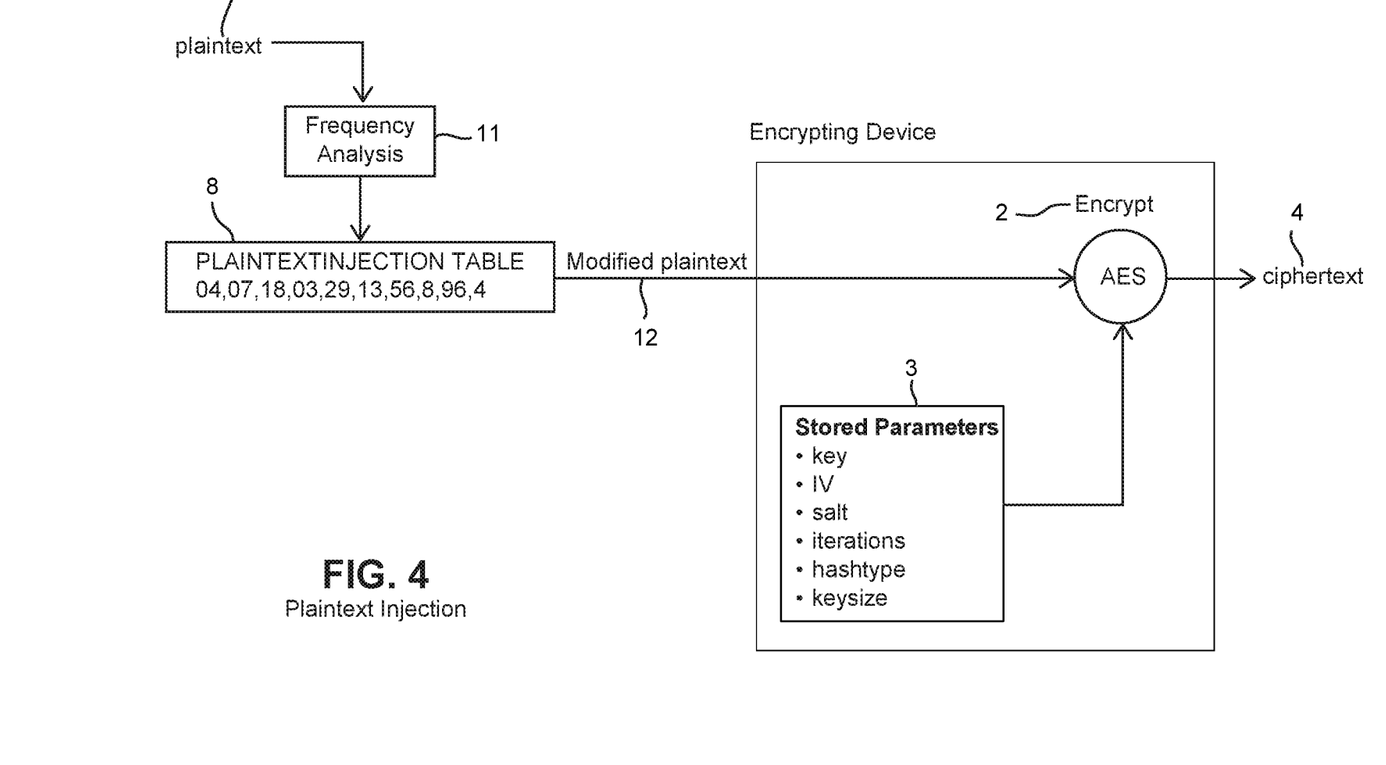
FIG. 4 illustrates one of the key concepts of the invention wherein specific characters are injected into the plaintext stream to mitigate the use of Frequency Analysis.

This example non-limiting technology obfuscates the plain text in such a way as to minimize the results of cryptanalysis tools. As seen in FIG. 4, the plaintext (1) is modified by first analyzing (11) the frequency of characters of the plaintext (1).

The result of the frequency analysis shows that in addition to the pronounced vowel distribution, consonants "j", "k", "m", "q", "u" and "z" are decidedly minimal and other consonants of minimal frequency. What is needed is to "level" the character distribution so as to make frequency analysis much more difficult.

The first step is to inject new low-frequency characters into the plaintext using a plaintext-injection table (8). The Plaintext Injection Table (8) is specifically designed for a particular enterprise and different from other enterprises.

Figure 5:
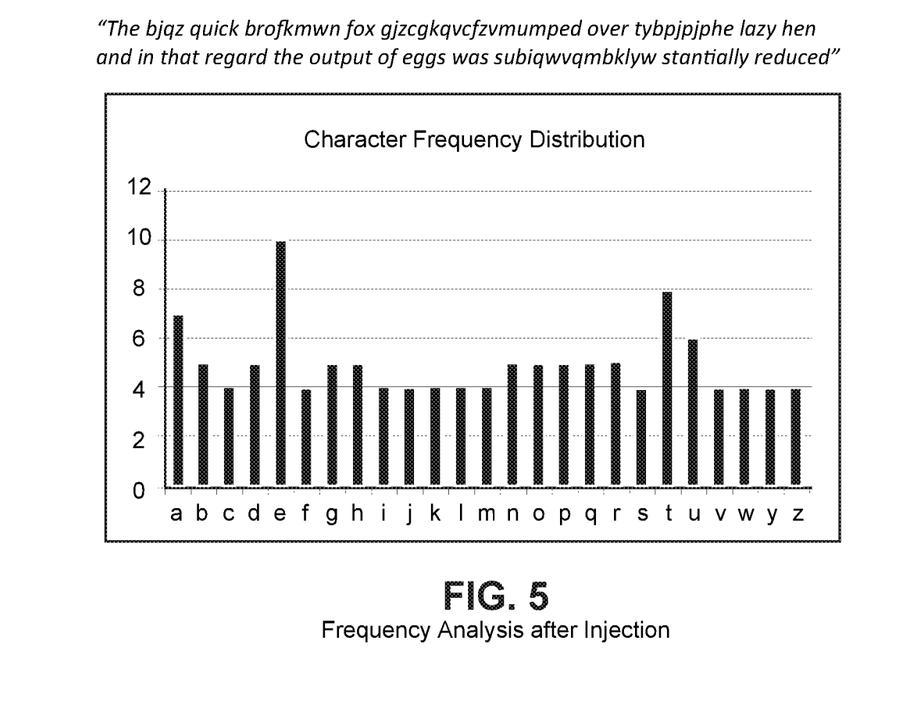
FIG. 5 shows the effects of good plaintext injection as dictated by an internal frequency analysis. The distribution is shown to be decidedly flatter.

The software reads this table (8) in pairs with the first number being the character position in the string and the second number of the pair indicating how many characters can be inserted at that position. The software then begins inserting new low-frequency characters at the specified locations. The resulting text shown below has a new character distribution as seen in FIG. 5 and the resulting character distribution is much more level than that of FIG. 3.

Scramble Table

Figure 6:
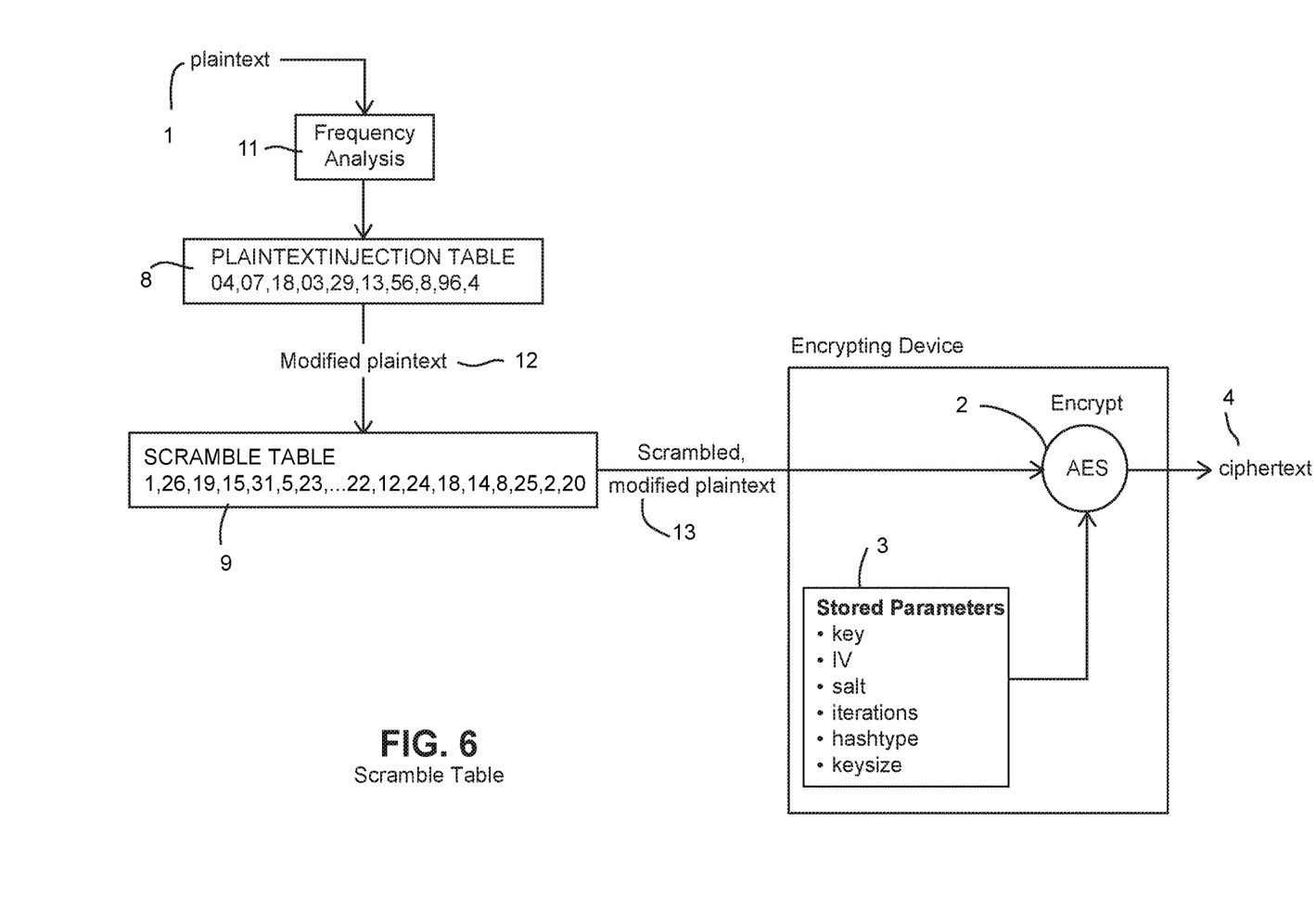
FIG. 6 shows the second key concept of the invention wherein a Scramble Table is used to change the order of characters after plaintext injection.

A second step in obfuscating the plaintext is to scramble the characters post Plaintext Injection (12) but prior to encryption. As shown in FIG. 6, the Scramble Table is customized for a particular enterprise and consists of a string of number pairs. The first number and second number of each pair indicate the positions in which to swap characters in a string. Thus in FIG. 5, the first two numbers in the Scramble Table (1, 16) indicate to the software to swap characters in positions 1 and 16 in the modified plaintext string (13). The process repeats for each pair of numbers in the Scramble Table (9). When the table is exhausted, the Scramble Table is applied to the next section of modified plaintext (12).

The resulting scrambled, modified plaintext (13) can now be encrypted. The result of this step and the previous step serves to make the decrypted text "non-readable" without further processing.

Ciphertext Injection

A third step takes place post-encryption. Typically, ciphertext is encapsulated and transmitted to the receiving side without modification. This example non-limiting technology takes steps to modify the ciphertext to prevent successful decryption without knowledge of the algorithm used to modify the ciphertext.

Figure 7:
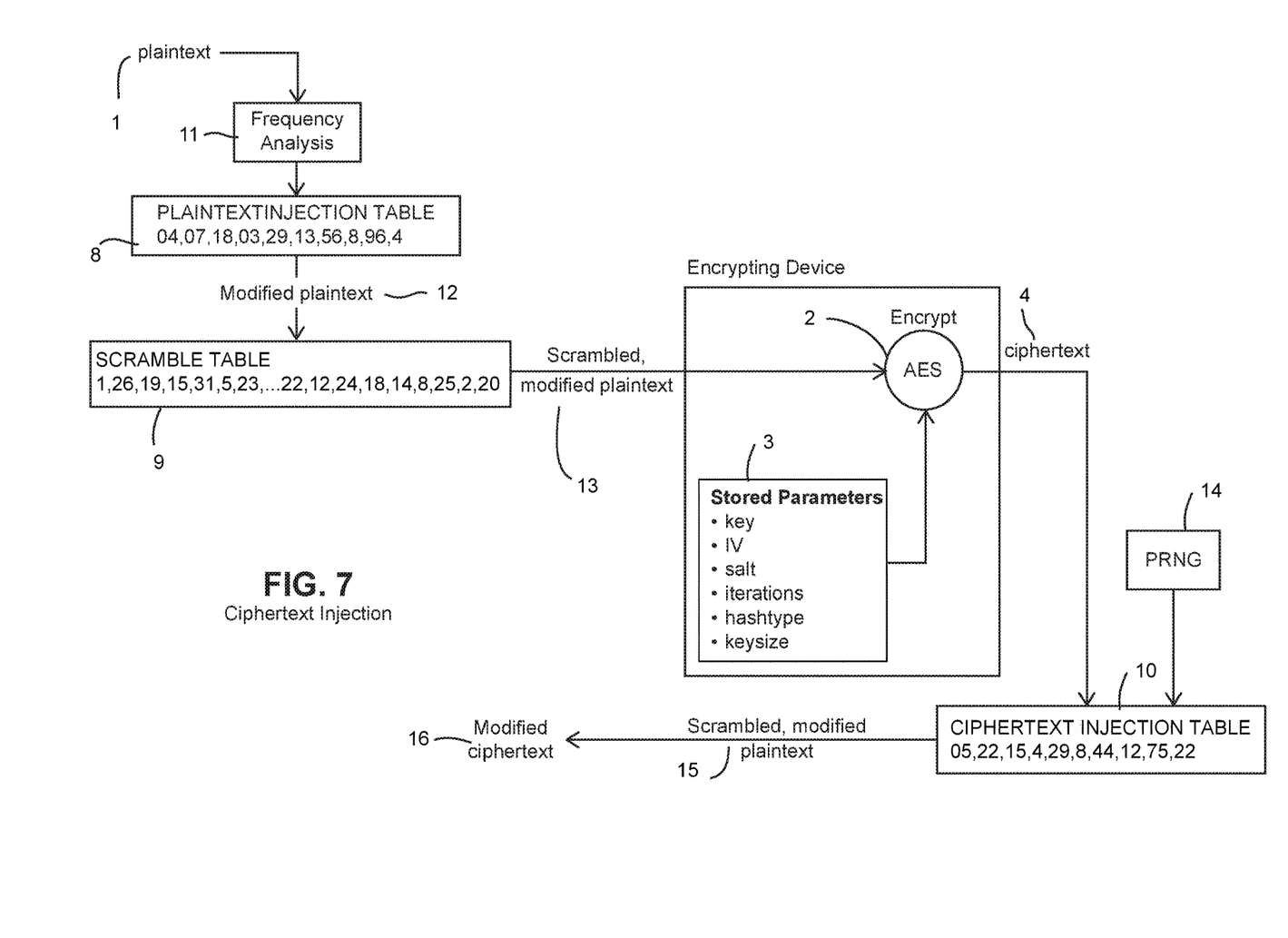
FIG. 7 shows the third key concept of this invention wherein random characters are placed in specific position of the ciphertext stream as controlled by the Ciphertext Injection Table.

As shown in FIG. 7, the ciphertext is modified using a Ciphertext Injection Table (5). The Ciphertext Injection Table (5) consists of a string of number pairs. The first number indicates the position to begin inserting characters; the second number indicates how many characters are to be inserted. A Pseudo-Random Number Generator (14) is used to generate random characters that are inserted into the ciphertext (4) at the position indicated by the first number of the number pair contained in the Ciphertext Injection Table (10). The process repeats until all number pairs in the Ciphertext Injection Table (10) is exhausted.

The resulting string (16) represents the original plaintext (1) after:

1. A frequency analysis (11) has been performed that results in modified plaintext (12) using characters inserted as specified by the frequency analysis (11) using the Plaintext Injection Table (8)

2. Modified plaintext (9) is further modified by scrambling character positions throughout the text (1) as controlled via the Scramble Table (9)

3. Encryption process (2) resulting in ciphertext (4)

4. Modified ciphertext (16) as a result of random characters (14) inserted into the ciphertext (4) at positions indicated by the Ciphertext Injection Table (10).

The modified ciphertext (16) makes it virtually impossible to recover the original plaintext even if all of the encryption parameters are known. Prior to decryption, the Ciphertext Injection Table (10) must be known in its entirety. The extraneous random ciphertext characters must be removed prior to attempting decryption. Only then will the scrambled (13), plaintext-injected text be recovered. This text however is completely non-obvious and bears little resemblance to the original plaintext. The recipient must also then know the Scramble Table (9) to first put the characters back in their proper position (12) and know the Plaintext Injection Table (8) to remove the inserted random characters and recover the original plaintext (1).

Random String

Figure 8:
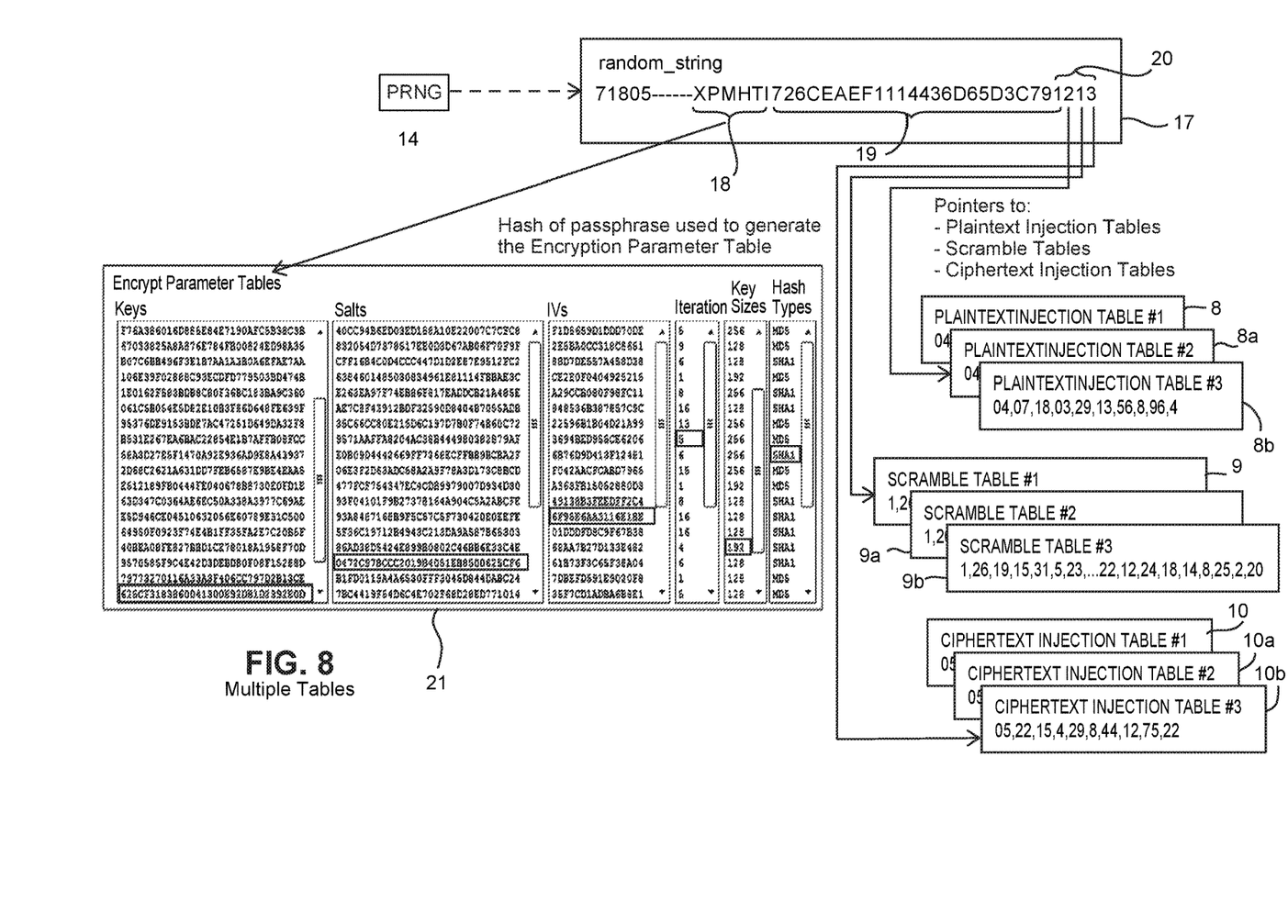
FIG. 8 shows an improved scenario wherein a random string is used to select from one or more each of Plaintext Injection Tables, Scramble Tables and Ciphertext Injection Tables.

An additional variation on this theme is shown in FIG. 8. A random_string (17) is generated using a Pseudo-Random Number Generator (14). Elements (18) of this random_string (17) are used to select Encryption Parameters from the Encryption Parameter Table (21) while another element (19) of the random_string (17) is used to convey a hash of the passphrase used to generate the Encryption Parameter Table (21).

Parameters can be specified within the string that act as pointers to multiple instances of the Plaintext Injection Table (8, 8a, 8b), Scramble Table (9, 9a, 9b) and Ciphertext Injection Table (10, 10a, 10b). The number of tables is left up to the programmer to implement. As the random_string generated for each message is random, it cannot be known in advance which combination of Plaintext Injection Table (8), Scramble Table (9) and Ciphertext Injection Table (10) will be utilized.

Variations on this theme are entirely up to the programmer. The illustrations and description thus far show one particular embodiment of these techniques.

The description contained herein is a "non-limiting exemplary embodiment" such that alternative cryptographic algorithms, tables, parameters etc. can be used. In particular, the set of encryption parameters chosen for encrypting a message or document will be based on more than a traditional two-party exchange and be derived in part from information specific to a particular user and user's device.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of obfuscating information comprising:
    injecting additional characters into a plaintext message;
    using at least one processor and associated memory, scrambling the plaintext message containing the injected additional characters;
    using encryption parameters, encrypting the scrambled plaintext message with the at least one processor and associated memory to produce ciphertext; and
    using the at least one processor and associated memory, modifying the ciphertext algorithmically to make it computationally difficult for an attacker to recover the plaintext message even if the attacker knows all of the encryption parameters.

2. The method of claim 1 wherein modifying the ciphertext includes inserting additional characters into the ciphertext thereby modifying the length of the ciphertext.

3. The method of claim 1 wherein modifying the ciphertext includes inserting random data into the ciphertext at positions within the ciphertext indicated by a ciphertext injection data structure.

4. The method of claim 3 further including removing the inserted random data from the modified Ciphertext before decrypting the ciphertext.

5. The method of claim 1 further including descrambling recovered plaintext subsequent to decrypting.

6. The method of claim 1 further including:
    using a pseudo-random number generator to generate a random string; and
    using the random string to select encryption parameters for encrypting the plaintext into ciphertext.

7. The method of claim 1 wherein a random string is used to point into a plaintext injection table specifying positions for injecting additional characters into the plaintext message.

8. A method for recovering obfuscated information comprising:
    using at least one processor and associated memory, removing extraneous additional inserted characters from ciphertext to recover a shorter ciphertext;
    using the at least one processor and associated memory, decrypting the recovered shorter ciphertext to produce scrambled plaintext;
    using the at least one processor and associated memory, descrambling the plaintext; and
    using the at least one processor and associated memory, removing extraneous additional characters inserted into the plaintext in order to thereby make the plaintext intelligible.

9. A system for exchanging secure information comprising:
    an encrypting device that encrypts plaintext into ciphertext;
    a decrypting device that decrypts ciphertext into recovered plaintext; and
    a ciphertext injection apparatus coupled between the encrypting device and decrypting devices, the ciphertext injection apparatus injecting extraneous ciphertext at randomly-selected locations within the ciphertext.

10. The method of claim 1 further including removing the injected additional characters before decrypting.

11. The method of claim 1 wherein the injected additional characters comprise low frequency characters.

12. A device for obfuscating information comprising:
    a data injector that injects extraneous data into a plaintext message; and
    at least one processor and associated memory operatively coupled to the data injector and configured to:
        scramble the plaintext message containing the injected extraneous data;
        use encryption parameters to encrypt the scrambled plaintext message with the at least one processor and associated memory to produce ciphertext, and
        modify the ciphertext algorithmically to make it computationally difficult for an attacker who possesses all of the encryption parameters to recover the original plaintext message.

13. The device of claim 12 wherein the data injector uses an injection table specifying pairs, the first number of each pair specifying a position in the plaintext message, the second number of each pair indicating how many data items to insert at the specified position.

14. The device of claim 12 wherein the data injector increases the length of the plaintext message by injecting the extraneous data into the plaintext message.

15. The device of claim 12 wherein the at least one processor and associated memory swap data at preselected positions within the plaintext message containing the injected extraneous data.

16. The device of claim 12 wherein the at least one processor and associated memory modifies the ciphertext based on a plurality of number pairs, the first number of each pair indicating the position to begin inserting data into the ciphertext, the second number of each pair indicating how many data items are to be inserted; and the device further includes a random number generator configured to generate random characters that the at least one processor inserts into the ciphertext at the positions indicated by the first numbers of the number pairs.

17. A device for deobfuscating information comprising:
at least one processor and associated memory configured to:
further modify a ciphertext that was previously algorithmically modified to make it computationally difficult for an attacker to recover the original plaintext even when at least one of the encryption parameters is known;
use encryption parameters to decrypt a scrambled plaintext message from the ciphertext; and
descramble the plaintext message; and
a data de-injector that removes extraneous additional data previously injected into the plaintext message to provide a shorter plaintext message.

18. The device of claim 17 wherein the data de-injector uses an injection table specifying pairs, the first number of each pair specifying a position in the plaintext message, the second number of each pair indicating how many data items are inserted at the specified position.

19. The device of claim 17 wherein the data de-injector modifies the length of the plaintext message by removing extraneous data injected into the plaintext message.

20. The device of claim 17 wherein the at least one processor and associated memory swap at least one data element at a preselected position within the plaintext message returning the at least one data element into its original position.

21. The device of claim 17 wherein the at least one processor and associated memory modify the ciphertext based on at least one of a plurality of number pairs, the first number of each pair indicating the position where data was inserted into the ciphertext, the second number of each pair indicating how many data items were inserted at said position.

22. A device for descrambling a message comprising:
a decryptor that receives an encrypted message and decrypts the encrypted message to provide a plaintext message;
at least one processor and associated memory operatively coupled to the decryptor and configured to descramble the decrypted plaintext message; and
a data de-injector that removes, from the descrambled plaintext message, extraneous data previously inserted into the plaintext message at randomly-selected locations within the plaintext message, the data de-injector providing a modified plaintext message.

23. The method of claim 22 wherein the data de-injector uses a random string to point into a plaintext injection table whose pairs specify positions at which extraneous characters were injected into the plaintext message and the quantities of extraneous random characters inserted at each position.

24. A device for receiving, decoding and decrypting a message comprising:
a data receiver that receives a message;
a decoder operatively coupled to the data receiver, the decoder being configured to extract extraneous data previously injected within the message to thereby produce a modified received message; and
a decryptor operatively coupled to the decoder, the decryptor being configured to decrypt the modified version of the received message to thereby produce a plaintext message.

25. A device for receiving, decrypting and decoding a message comprising:
a data receiver that receives a message;
a decryptor operatively coupled to the data receiver, the decryptor being configured to decrypt the received message to thereby produce a plaintext message; and
a decoder operatively coupled to the decryptor, the decoder being configured to extract extraneous data previously injected within the plaintext message to thereby produce a modified plaintext message.

26. A device for receiving, decoding and decrypting a message comprising:
a data receiver that receives a message;
a decoder operatively coupled to the data receiver, the decoder being configured to (a) descramble the received message to thereby produce a modified received message, (b) extract extraneous data previously injected within the message to thereby produce a modified received message, (c) extract extraneous data previously injected within a plaintext message to thereby produce a modified plaintext message, and (d) descramble the modified plaintext message; and
a decryptor operatively coupled to a decoder, the decryptor being configured to decrypt a modified version of the received message to thereby produce the plaintext message.

27. The device of claim 26 wherein the decoder removes the extraneous data from ciphertext before the decryptor decrypts the ciphertext.

28. The device of claim 26 wherein the decoder uses a de-injection table that records the predetermined locations within the message and the amount of extraneous data previously injected at each said location.

* * * * *